United States Patent
Dubost et al.

(10) Patent No.: US 10,962,075 B2
(45) Date of Patent: Mar. 30, 2021

(54) SHOCK ABSORBER SYSTEM COMPRISING A PRIMARY SHOCK ABSORBER DEVICE AND A SECONDARY SHOCK ABSORBER DEVICE OF DIFFERENT STIFFNESSES, ASSOCIATED STRUCTURE AND AIRCRAFT

(71) Applicant: Airbus Operations SAS, Toulouse (FR)

(72) Inventors: Jérôme Dubost, La Salvetat Saint Gilles (FR); Guilhem Colombies, Blagnac (FR); Julien Guesdon, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 13 days.

(21) Appl. No.: 16/230,233

(22) Filed: Dec. 21, 2018

(65) Prior Publication Data

US 2019/0195304 A1    Jun. 27, 2019

(30) Foreign Application Priority Data

Dec. 27, 2017  (FR) ...................................... 1763279

(51) Int. Cl.
*F16F 7/00* (2006.01)
*F16F 7/12* (2006.01)
(Continued)

(52) U.S. Cl.
CPC ................ *F16F 7/003* (2013.01); *B64C 1/18* (2013.01); *B64D 45/00* (2013.01); *F16F 3/02* (2013.01);
(Continued)

(58) Field of Classification Search
CPC ...... F16F 7/12; F16F 7/003; F16F 3/02; F16F 7/123; F16F 13/04; F16F 1/428;
(Continued)

(56) References Cited

U.S. PATENT DOCUMENTS 759,507 A * 5/1904 Ericson .................. B60G 11/02
267/42
1,839,015 A * 12/1931 Deveaux ............... B60R 19/285
293/136
(Continued)

FOREIGN PATENT DOCUMENTS

CN      106347814 A    1/2017
WO    2009101372 A1    8/2009
WO    2010013713 A1    2/2010

OTHER PUBLICATIONS

French Search Report; priority document.

*Primary Examiner* — Bradley T King
*Assistant Examiner* — James K Hsiao
(74) *Attorney, Agent, or Firm* — Greer, Burns & Crain, Ltd.

(57) ABSTRACT

To increase a compactness of damping systems intended to operate in the event of a dynamic landing of an aircraft, a damping system comprises a primary damper device and a secondary damper device. The primary damper device comprises at least one beam, each beam extending along a direction of a longitudinal axis. The damping system is configured so that at rest, the primary damper device has a stiffness greater than a stiffness of the secondary damper device in the direction of the longitudinal axis. When a force is applied to the damping system along the direction of the longitudinal axis, with a value less than a limit value, each beam remains in a compression state. When the force applied has a value greater than or equal to the limit value, each beam undergoes buckling and the secondary damper device undergoes elastic deformation.

10 Claims, 5 Drawing Sheets

(51) Int. Cl.
  *B64C 1/18*     (2006.01)
  *B64D 45/00*    (2006.01)
  *F16F 13/04*    (2006.01)
  *F16F 3/02*     (2006.01)
  *F16F 1/42*     (2006.01)

(52) U.S. Cl.
  CPC .............. *F16F 7/123* (2013.01); *F16F 13/04* (2013.01); *F16F 1/428* (2013.01); *F16F 2224/0208* (2013.01); *F16F 2224/0233* (2013.01); *F16F 2226/04* (2013.01); *F16F 2226/048* (2013.01); *F16F 2228/066* (2013.01); *F16F 2234/02* (2013.01); *F16F 2236/04* (2013.01)

(58) Field of Classification Search
  CPC ........... F16F 224/0233; F16F 2228/066; F16F 2234/02; F16F 2236/04
  USPC .................................................. 188/371, 377
  See application file for complete search history.

(56) References Cited

U.S. PATENT DOCUMENTS

| | | | | |
|---|---|---|---|---|
| 2,594,665 | A * | 4/1952 | Lockwood | F16F 15/073 267/28 |
| 3,198,506 | A * | 8/1965 | Thorn | F16F 7/09 267/135 |
| 3,204,913 | A * | 9/1965 | Lawrence | F16F 7/14 248/570 |
| 3,251,145 | A * | 5/1966 | Mack | A43B 13/182 36/7.8 |
| 3,270,998 | A * | 9/1966 | Keetch | F16F 3/10 267/140.3 |
| 3,373,629 | A * | 3/1968 | Wight | B62D 1/192 74/492 |
| 3,412,628 | A * | 11/1968 | De Gain | B60R 19/34 74/492 |
| 3,528,530 | A * | 9/1970 | Franck | B64D 1/14 188/377 |
| 3,584,858 | A * | 6/1971 | Beck | F16F 1/3713 267/153 |
| 3,663,048 | A * | 5/1972 | Zimmerle | B60R 19/36 293/135 |
| 3,724,833 | A * | 4/1973 | Sergay | B60R 19/36 267/140 |
| 3,737,155 | A * | 6/1973 | Karlan | F16F 1/027 267/136 |
| 3,972,390 | A * | 8/1976 | Melton | B62D 1/192 188/377 |
| 4,269,400 | A * | 5/1981 | Jensen | F16F 1/025 188/268 |
| 4,312,430 | A * | 1/1982 | Ohtani | F16F 7/123 188/377 |
| 4,535,553 | A * | 8/1985 | Derderian | A43B 13/181 36/28 |
| 4,586,689 | A * | 5/1986 | Lantero | F16F 7/14 248/570 |
| 4,801,019 | A * | 1/1989 | Smolen, Jr. | B60G 11/00 267/149 |
| 4,856,626 | A * | 8/1989 | Nakanishi | F16F 3/08 188/371 |
| 4,974,820 | A * | 12/1990 | Nakanishi | F16F 3/08 188/268 |
| 5,149,066 | A * | 9/1992 | Snaith | F16F 7/14 248/636 |
| 5,169,110 | A * | 12/1992 | Snaith | F16F 7/14 248/570 |
| 5,358,210 | A * | 10/1994 | Simon | F16F 1/40 244/173.2 |
| 5,758,861 | A * | 6/1998 | Feldhaus | F16F 1/373 248/583 |
| 5,868,384 | A * | 2/1999 | Anderson | F16F 1/3732 267/140 |
| 6,290,217 | B1 * | 9/2001 | Schneider | F16F 7/14 188/378 |
| 6,299,150 | B1 * | 10/2001 | Allen | F16F 1/024 188/378 |
| 6,406,011 | B1 * | 6/2002 | Kosar | F16F 7/14 248/570 |
| 6,427,990 | B1 * | 8/2002 | Hartmann | A47C 23/002 267/103 |
| 6,435,490 | B1 * | 8/2002 | Monson | F16F 1/374 267/141 |
| 6,530,564 | B1 * | 3/2003 | Julien | A43B 13/186 267/147 |
| 6,880,267 | B2 * | 4/2005 | Smaldone | A43B 1/0072 36/28 |
| 6,994,333 | B2 * | 2/2006 | Lobry | A47C 23/002 267/103 |
| 8,814,092 | B2 | 8/2014 | Milliere et al. | |
| 9,097,308 | B2 * | 8/2015 | Lobry | A47C 23/002 |
| 9,140,278 | B2 * | 9/2015 | Sorvino | F16B 5/00 |
| 10,034,516 | B2 * | 7/2018 | Gheorghian | F16F 1/36 |
| 10,059,487 | B2 * | 8/2018 | Sun | B65D 81/02 |
| 10,722,042 | B2 * | 7/2020 | Cailley | A47C 23/067 |
| 2002/0163114 | A1 * | 11/2002 | Lobry | A47C 23/002 267/142 |
| 2003/0047121 | A1 * | 3/2003 | Gruber | F16F 1/428 108/57.12 |
| 2006/0064900 | A1 * | 3/2006 | Aveni | A43B 13/183 36/28 |
| 2008/0313928 | A1 * | 12/2008 | Adams | A63C 17/08 36/103 |
| 2009/0047470 | A1 | 2/2009 | Kuwajima et al. | |
| 2011/0233975 | A1 * | 9/2011 | Mindel | B60N 2/24 297/216.17 |
| 2012/0137541 | A1 * | 6/2012 | Yeo | A43B 13/182 36/27 |
| 2015/0034439 | A1 * | 2/2015 | Galbus | B64F 1/02 188/377 |
| 2016/0123422 | A1 * | 5/2016 | Keinanen | F16F 7/14 188/380 |

* cited by examiner

SHOCK ABSORBER SYSTEM COMPRISING A PRIMARY SHOCK ABSORBER DEVICE AND A SECONDARY SHOCK ABSORBER DEVICE OF DIFFERENT STIFFNESSES, ASSOCIATED STRUCTURE AND AIRCRAFT

CROSS-REFERENCES TO RELATED APPLICATIONS

This application claims the benefit of the French patent application No. 1763279 filed on Dec. 27, 2017, the entire disclosures of which are incorporated herein by way of reference.

FIELD OF THE INVENTION

The present invention relates to a damping system extending along a longitudinal axis. The invention also relates to an aircraft structure comprising such a damping system, and an aircraft comprising such a structure.

The invention applies to the field of aeronautics, in particular to the dissipation of the impact energy applied to an aircraft in a landing or crash situation.

BACKGROUND OF THE INVENTION

An aircraft comprises a set of mechanical elements, essential to the flight of the aircraft, including skins that are reinforced by circumferential frames and longitudinal stiffeners. This set of mechanical elements indispensable to the flight is generally called "primary structure."

The aircraft also comprises structures to which particular functions are assigned. For example, such a structure is a floor structure, for example a passenger cabin floor structure. According to another example, in the field of freight, such a structure is a vertical partition whose function is to separate the cockpit from a volume of the aircraft intended to receive containers.

Generally, such a structure comprises crosspieces connected to the circumferential frames by their ends, as well as a mesh of spacers. For example, each spacer is connected, at one of its ends, to a corresponding crosspiece of the structure and, at the other one of its ends, to a corresponding circumferential frame. Such a mesh of spacers is, for example, designed to support the structure, to stiffen it, or even to provide a damping function.

In the case of passenger transport, it is essential, during a dynamic landing, that the impact energy is optimally dissipated, so that the impact of the shock, including the vertical impact, on cabin passengers, remain below regulatory limits, or remain as low as possible.

In addition, in the case of freight, the containers may be thrown forward. It is therefore essential to try to protect the crew in the cockpit from shocks generated by such a displacement of the containers.

It has been envisaged to provide the previously described structures with spacers in the form of compression beams of composite material. For example, as described in patent document WO 2009/101372 A1, each such spacers comprises, at one of its ends, a gusset adapted to cut the spacer under the effect of a high level compression force such as that resulting from a dynamic landing. In this case, the spacers form damping devices.

However, such structures are not entirely satisfactory.

Indeed, in such structures, each spacer is sized to withstand the cutting means of the corresponding gusset when the spacer is subjected to a compression force corresponding to normal use (for example, in the case of a floor, a compression force induced by the loading of the floor), so that the cutting of the spacer only occurs in the case of a crash.

This generally leads to oversized spacers, which in turn results in an increase in the size of such spacers, compared to conventional spacers, which is particularly prejudicial in the field of aeronautics.

An object of the invention is therefore to provide a damping system which is able to dissipate the impact energy in a satisfactory fashion, while having a smaller size compared to damping devices of the state of the art.

SUMMARY OF THE INVENTION

For this purpose, a subject of the invention is a damping system of the aforementioned type, comprising:
a first base and a second base arranged at a distance from one another along the longitudinal axis;
a primary damper device, the primary damper device comprising at least one beam, each beam extending along the longitudinal axis, each beam comprising two opposite ends and being attached to the first base by one of its two ends and to the second base by the other one of its two ends;
a secondary damper device comprising two opposite ends, the secondary damper device being connected to the first base by the one of its two ends, and to the second base by the other one of its two ends;
the damping system being configured so that:
at rest, the primary damper device has a stiffness, along the longitudinal axis, greater than the stiffness of the secondary damper device along the longitudinal axis;
when a force applied to the damping system for urging the first base towards the second base has a value less than a predetermined limit value, each beam remains in a state of compression; and
when the force has a value greater than or equal to the limit value, each beam undergoes buckling and the secondary damper device undergoes elastic deformation.

Indeed, the primary damper device and the secondary damper device are such that, during the application of a longitudinal force on the damping system urging the first base towards the second base, and as long as the value of the effort longitudinal is less than the limit value, the primary damper device takes up the majority of the effort, the stiffness of the primary damper device being greater than the stiffness of the secondary damper device. In this case, the beams remain in a state of compression.

If the value of the force reaches the limit value, the beams buckle and dissipate a portion of the energy associated with the longitudinal force applied on the damping system. In addition, because of buckling, the beams are no longer able to take up the longitudinal force. In this case, the secondary damper device undergoes a deformation and takes up the force exerted on the damping system, dissipating an additional portion of the energy associated with the longitudinal force, in particular by elastic deformation. Consequently, the use of a dissipation of the energy associated with the force, successively by the primary damper device and then by the secondary damper device, provides the damping system according to the invention with the ability to dissipate energy more efficiently than the devices of the state of the art.

It results from the above that, at equivalent performance, the damping system according to the invention is likely to have a smaller size compared to the structures of the state of the art described above.

According to other beneficial aspects of the invention, the damping system comprises one or more of the following characteristics, either taken alone or in any technically possible combination:
- the secondary damper device comprises at least one curved member, each curved member comprising two opposite ends, each curved member being connected to the first base by one of its two ends, and to the second base by the other one of its two ends, each curved member being configured to undergo elastic bending when the force has a value within a range beyond the limit value;
- each curved member is hollow and/or each beam is solid;
- each beam is radially closer to the longitudinal axis than each curved member;
- at least one curved member comprises two arches, each of the two arches comprising two opposite ends, the two ends of each curved member being each formed by the union of two corresponding respective ends of the two arches, the two arches each having a concavity, the concavities of the two arches facing away from each other;
- the damping system comprises a single curved member, the curved member having circular symmetry around the longitudinal axis;
- at least one curved member comprises a straight portion extending along the longitudinal axis and a plurality of hoops, the straight portion comprising two opposite ends, each hoop comprising two opposite ends, each of the two ends of each hoop being attached to a corresponding end of the straight portion;
- the secondary damper device comprises at least one meshed element, each meshed element having a three-dimensional lattice structure, each meshed element comprising two opposite ends, each meshed element being connected to the first base by one of its two ends, and to the second base by the other one of its two ends, each meshed element being configured to undergo elastic biasing of one of its two ends towards the other one of its two ends when the force has a value within a range beyond the limit value.

In addition, the invention concerns an aircraft structure comprising at least one damping system as defined above, each damping system being configured to take up at least part of the forces exerted on the structure.

According to another beneficial aspect of the invention, the structure comprises the following characteristic: the damping system forms a spacer connecting at least two structural elements fixed relative to each other.

In addition, the invention concerns an aircraft comprising a structure as defined above.

BRIEF DESCRIPTION OF THE DRAWINGS

The invention will be better understood using the following description, given solely as a non-limiting example and made with reference to the accompanying drawings in which.

DETAILED DESCRIPTION OF THE PREFERRED EMBODIMENTS

Figure 1:
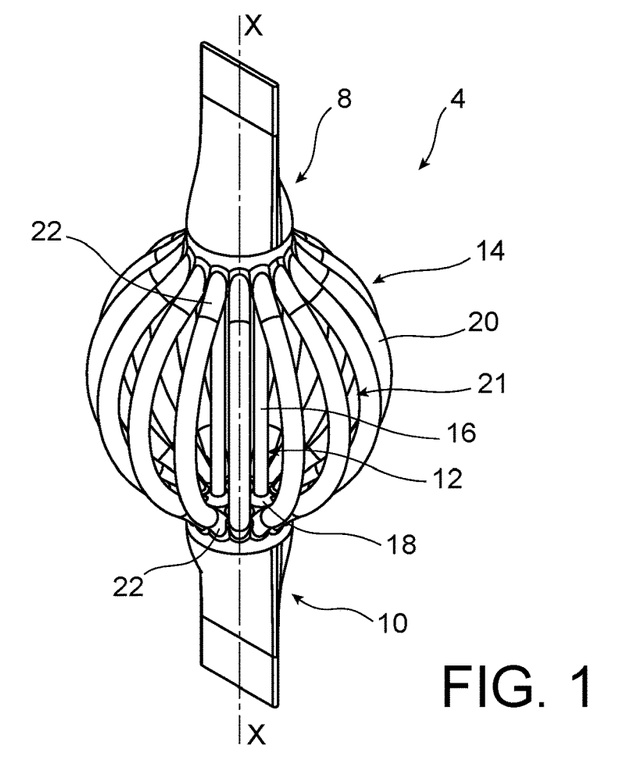
FIG. 1 is a perspective view of a first embodiment of a damping system according to the invention.
Figure 2:
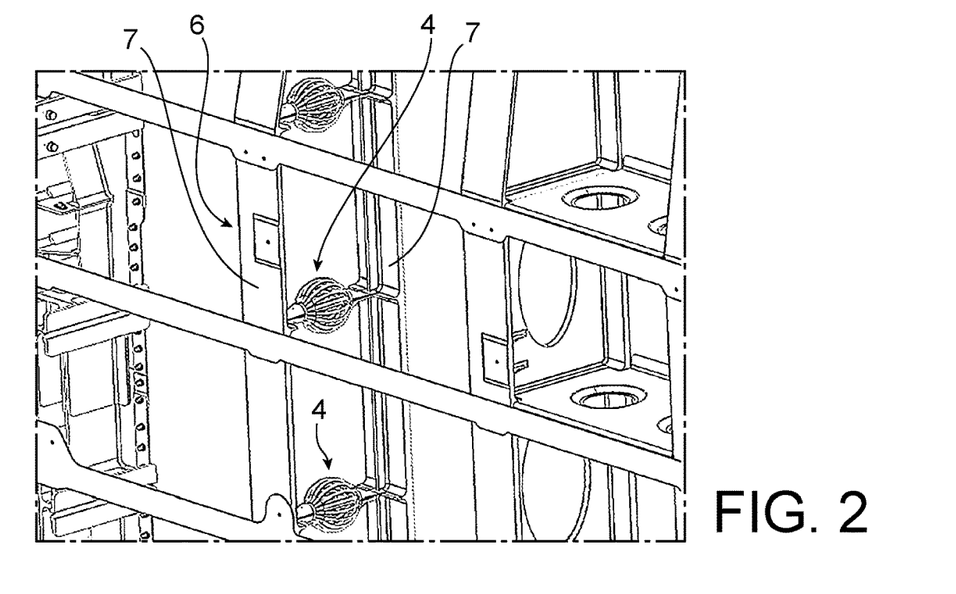
FIG. 2 is a perspective view of a partition in which is integrated the damping system of FIG. 1.
Figure 3:
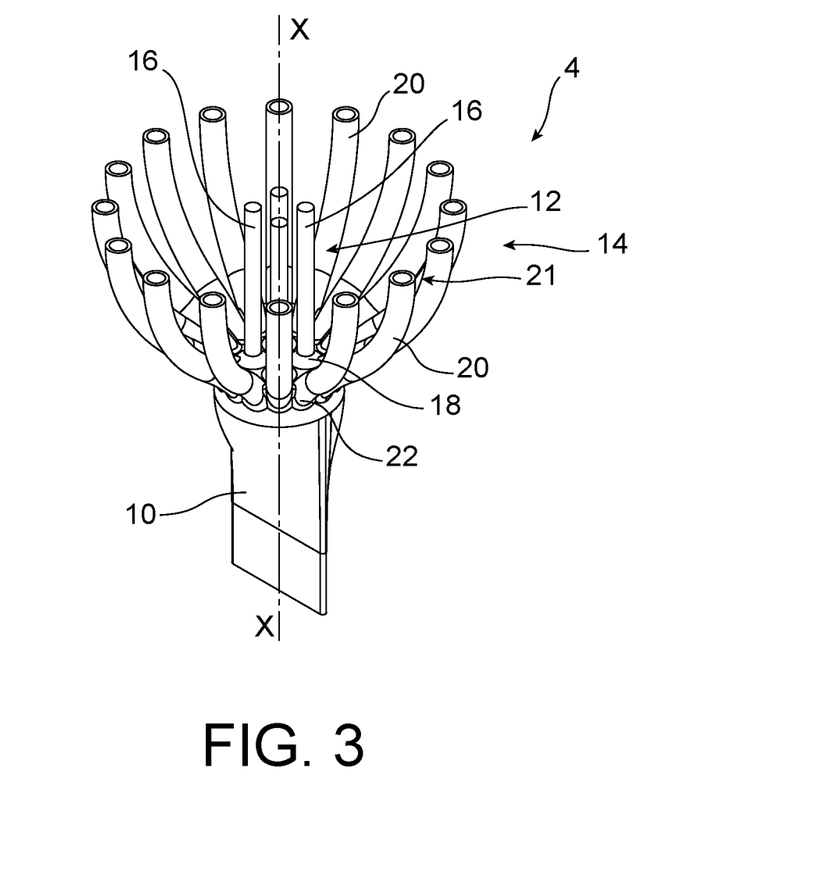
FIG. 3 is a perspective view of part of the damping system of FIG. 1, cut along a plane orthogonal to a longitudinal axis of the damping system.

A damping system 4 according to the invention is shown in FIGS. 1 to 3.

The damping system 4 is intended to be integrated in a structure 2, in particular, an aircraft structure. For example, the structure 2 is a floor structure, or a partition, as shown in FIG. 2.

In the structure 2, the damping system 4 is configured to take up at least part of the forces exerted on the structure 2. For example, the damping system 4 forms a spacer of the structure 2, connecting at least two structural elements 6 of the structure 2 which are fixed relative to each other, such as crosspieces 7.

The damping system 4 extends along a corresponding longitudinal axis X-X.

The damping system 4 comprises a first base 8, a second base 10, a primary damper device 12 and a secondary damper device 14.

The first base 8 and the second base 10 are configured to allow the fastening of the damping system 4 to the structural elements 6. In particular, during the implementation of the damping system 4, and as shown in FIG. 2, each of the first base 8 and the second base 10 is fastened to a respective structural element 6 of the structure 2.

The first base 8 and the second base 10 are arranged at a distance from each other along the longitudinal axis X-X, in particular, kept at a distance from each other by the primary damper device 12 and the secondary damper device 14, as will appear from the following description.

The primary damper device 12 and the secondary damper device 14, which will now be described, are configured so that, when the damping system 4 is at rest, the primary damper device 12 has a stiffness along the longitudinal axis X-X greater than the stiffness of the secondary damper device 14 along the longitudinal axis X-X.

The primary damper device 12 comprises at least one beam 16. For example, the primary damper device 12 comprises four beams 16.

Each beam 16 extends along the longitudinal axis X-X.

Each beam 16 comprises two opposite ends 18. Each beam 16 is attached to the first base 8 by one of its two ends 18, and to the second base 10 by the other one of its two ends 18.

The ends 18 of the beams 16, which are located on a same side along the longitudinal axis and which are attached to the first base 8, form a first end of the primary damper device 12.

The ends 18 of the beams 16, which are located on a same side along the longitudinal axis and which are attached to the second base 10, form a second end of the primary damper device 12.

Preferably, each beam 16 is solid. This is beneficial, insofar as, when a compressive force is exerted along the longitudinal axis X-X of the damping system 4, the part of the force taken up by the beams 16 is all the higher as the amount of material per beam section 16, in a sectional plane of the beam 16 which is orthogonal to the longitudinal axis X-X, is high.

For example, each beam 16 is a solid tube with circular section.

The beams 16 are dimensioned so that, when a force, applied to the damping system 4 to urge the first base 8 towards the second base 10 along the longitudinal axis X-X, has a value less than a predetermined limit value, each beam 16 undergoes a deformation in compression. In addition, the beams 16 are dimensioned so that when the force has a value greater than or equal to the limit value, each beam 16 undergoes buckling.

The force applied to the damping system 4 to urge the first base 8 towards the second base 10 along the longitudinal axis X-X will be called a "longitudinal force."

The secondary damper device 14 comprises at least one curved member 20.

Preferably, the secondary damper device 14 comprises a plurality of curved members 20 regularly distributed about the longitudinal axis X-X.

For example, the secondary damper device 14 comprises sixteen curved members 20.

Each curved member 20 is curved. Preferably, each curved member 20 extends in a plane containing the longitudinal axis X-X.

Each curved member 20 comprises two opposite ends 22. Each curved member 20 is secured to the first base 8 by one of its two ends 22, and the second base 10 by the other one of its two ends 22.

The ends 22 of the curved members 20 which are located on a same side along the longitudinal axis and which are attached to the first base 8 form a first end of the secondary damper device 14. The ends 22 of the curved members 20 which are located on a same side along the longitudinal axis and which are attached to the second base 10 form a second end of the secondary damper device 14.

Preferably, each curved member 20 is hollow. This is beneficial, insofar as a hollow curved member 20 is able, during application, on the curved member 20, of a bending force tending to bring the two ends 22 of the curved member 20 closer to each other, to dissipate an energy substantially equivalent to the energy dissipated by a solid curved member of the same dimensions, while being lighter. This is because a central portion of a solid curved member substantially dissipates no energy under the same conditions.

For example, each curved member 20 is a hollow curved cylinder with a circular section.

Preferably, the beams 16 and the curved members 20 are arranged such that the beams 16 are radially closer to the longitudinal axis X-X than the curved members 20.

For example, the curved members 20 are regularly arranged around the beams 16. In particular, a concavity 21 of each curved member 20 is oriented towards the longitudinal axis X-X, as shown in FIG. 3.

In addition, the curved members 20 are dimensioned so that each curved member 20 undergoes elastic flexion when the longitudinal force has a value within a range beyond the aforementioned limit value.

The beams 16, arranged to undergo compression, have a greater stiffness than the stiffness of the curved members 20, which are arranged to undergo flexion. This provides the primary damper device 12 with a stiffness that is greater than the stiffness of the secondary damper device 14.

As a nonlimiting example, each of the first base 8, the second base 10, the primary damper device 12 and the secondary damper device 14 is made of titanium, for example in an alloy commonly called "titanium TA6V," comprising titanium, aluminum up to 7%, vanadium up to 4.5% and possibly traces of carbon, iron, oxygen and nitrogen.

In another example, each of the first base 8, the second base 10, the primary damper device 12 and the secondary damper device 14 is made of aluminum.

The first base 8, the second base 10, the primary damper device 12 and the secondary damper device 14 are preferably integral, for example manufactured jointly by additive manufacturing.

Alternatively, the primary damper device 12 and the secondary damper device 14 are attached to the first base 8 and the second base 10 by welding or any other known method of attachment.

By way of example, at rest, the assembly formed by the primary damper device 12 and the secondary damper device 14 has an extent, along the longitudinal axis X-X, of the order of 100 mm (millimeters), and the damping system 4 has an extent, along the longitudinal axis X-X, of the order of 200 mm. In this case, the damping system 4 can be dimensioned so that the primary damper device 12 is able to withstand a longitudinal force up to a limit value of about 90 kN (kilonewton) before the beams 16 undergo buckling. In addition, the curved members 20 can support an additional longitudinal force of 20 kN during their deformation.

The operation of the damping system 4 will now be described.

A longitudinal force, applied to the damping system 4, urges the first base 8 towards the second base 10.

As long as the value of the longitudinal force is less than the limit value, the primary damper device 12, in particular the beams 16, takes up the majority of the force, the stiffness of the primary damper device 12 being greater than the stiffness of the secondary damper device 14. In this case, the beams 16 remain in a state of compression. The flexion of the curved members 20 is negligible with regard to their shape at rest.

If the value of the force reaches the limit value, the beams 16 undergo buckling and dissipate part of the energy associated with the longitudinal force exerted on the damping system 4. In addition, because of buckling, the beams 16 are no longer able to take up the longitudinal force. In this case, the curved members 20 bend and take up the force exerted on the damping system 4, dissipating an additional portion of the energy associated with the longitudinal force, in particular by elastic deformation.

It is conceivable that the curved members 20 undergo plastic deformation for a longitudinal force of even greater value.

Additional embodiments of the damping system according to the invention will now be described. Only the differences with respect to the damping system 4 of FIGS. 1 to 3 will be described, the remaining features being similar.

Figure 4:
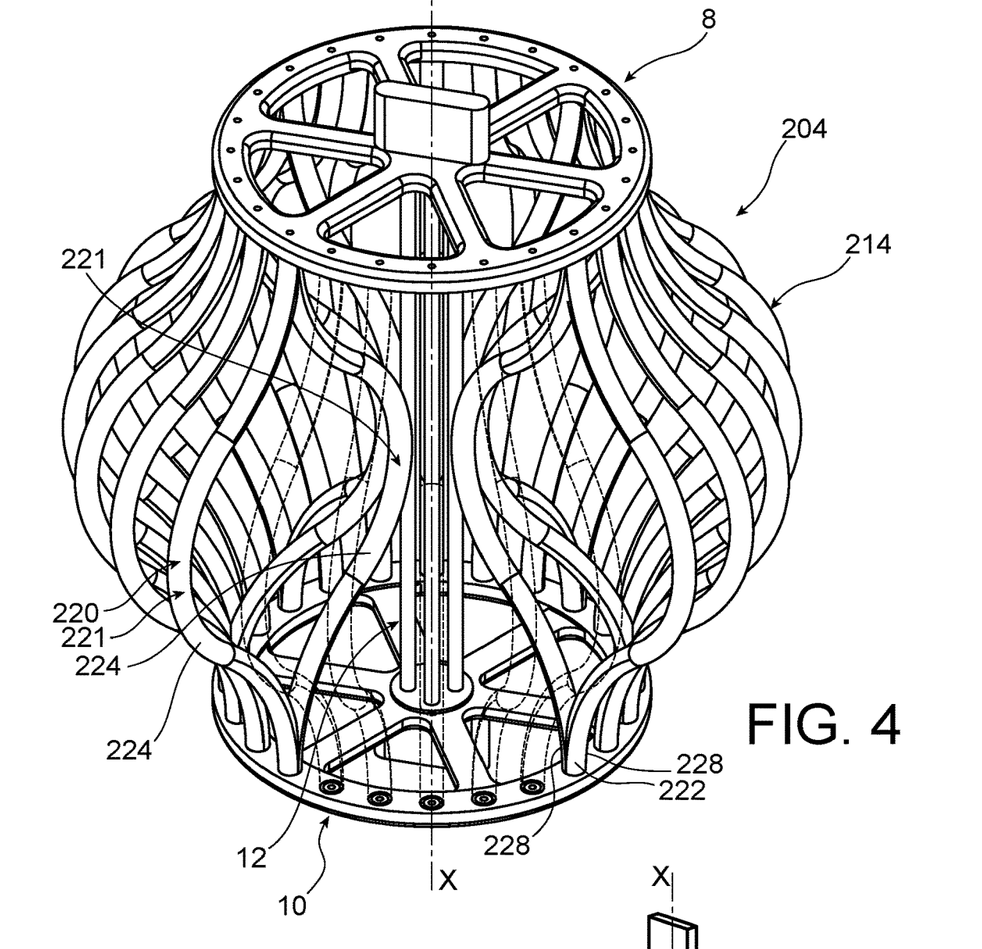
FIG. 4 is a perspective view of a second embodiment of a damping system according to the invention, in which some of the curved members of the damping system are shown in dotted lines.

The damping system 204 of FIG. 4 differs from the damping system 4 of FIGS. 1 to 3 in that the secondary damper device 214 comprises at least one curved member 220 comprising two arches 224 having concavities 221 oriented opposite with respect to each other. For example, one of the two arches 224 is arranged on the longitudinal axis side and has a concavity 221 facing away from the longitudinal axis X-X, while the other one of the two arches 224 is arranged on the opposite side opposite and has a concavity 221 oriented towards the longitudinal axis X-X.

Each arch 224 comprises two opposite ends 228. The ends 228 of the two arches 224 which are longitudinally on the same side are interconnected to form an end 222 of the curved member 220.

In this FIG. 4, some of the arched members 220 have been shown in dashed lines to give a better readability to the figure, in particular to allow a better visualization of the arches 224.

Figure 5:
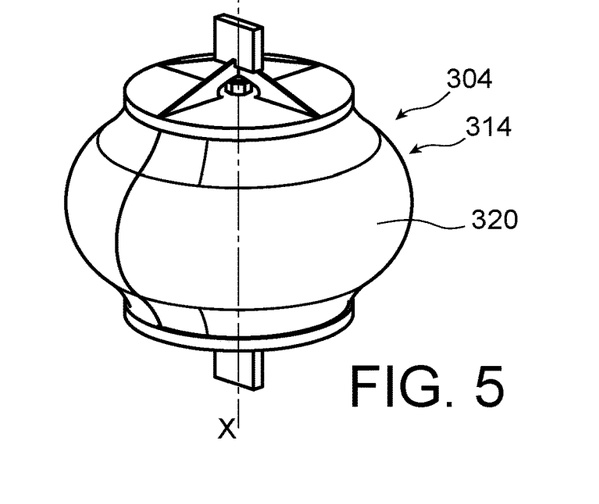
FIG. 5 is a perspective view of a third embodiment of a damping system according to the invention.

The damping system 304 of FIG. 5 differs from the damping system 4 of FIGS. 1 to 3 in that the secondary damper device 314 of the damping system 304 comprises a single curved member 320. In this case, the curved member 320 has circular symmetry around the longitudinal axis X-X.

Figure 6:
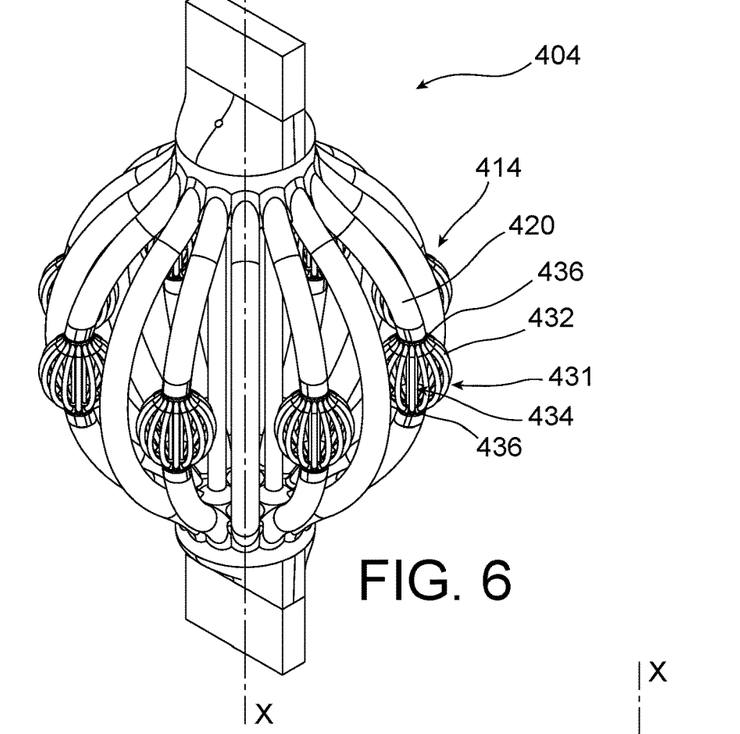
FIG. 6 is a perspective view of a fourth embodiment of a damping system according to the invention.
Figure 7:
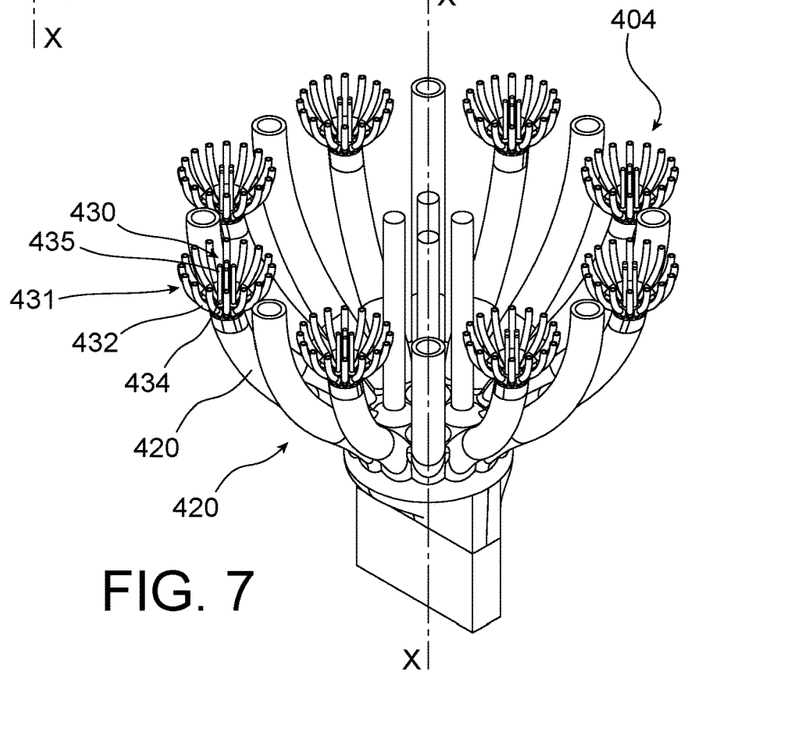
FIG. 7 is a perspective view of part of the damping system of FIG. 6, cut along a plane orthogonal to a longitudinal axis of the damping system.

The damping system 404 of FIGS. 6 and 7 differs from the damping system 4 of FIGS. 1 to 3 in that each curved member 420 of the secondary damper device 414 comprises a damping member 431. Each member 431 comprises a straight portion 430 and a plurality of corresponding hoops 432.

The straight portion 430 corresponds, for example, to a median portion of the corresponding curved member 420.

The straight portion 430 comprises two opposite ends 434, attached to the corresponding curved member 420.

For example, the straight portion 430 is formed by a plurality of straight segments 435 extending along the longitudinal axis X-X.

In addition, each hoop 432 comprises two opposite ends 436, each end 436 of each hoop 432 being attached to a respective end 434 of the straight portion 430, so that the damping member 431 has a geometry similar to the geometry of the damping system 4 of FIGS. 1 to 3.

Alternatively, the damping member 431 has a geometry similar to the geometry of the damping system 204 of FIG. 4 or the damping system 304 of FIG. 5, or any other suitable geometry.

More generally, in certain embodiments of the invention, the damping member 431 has a geometry such that the damping member 431 comprises a primary damper device and a secondary damper device, the primary damper device having a stiffness, along the longitudinal axis X-X, greater than the stiffness of the secondary damper device along the longitudinal axis.

Figure 8:
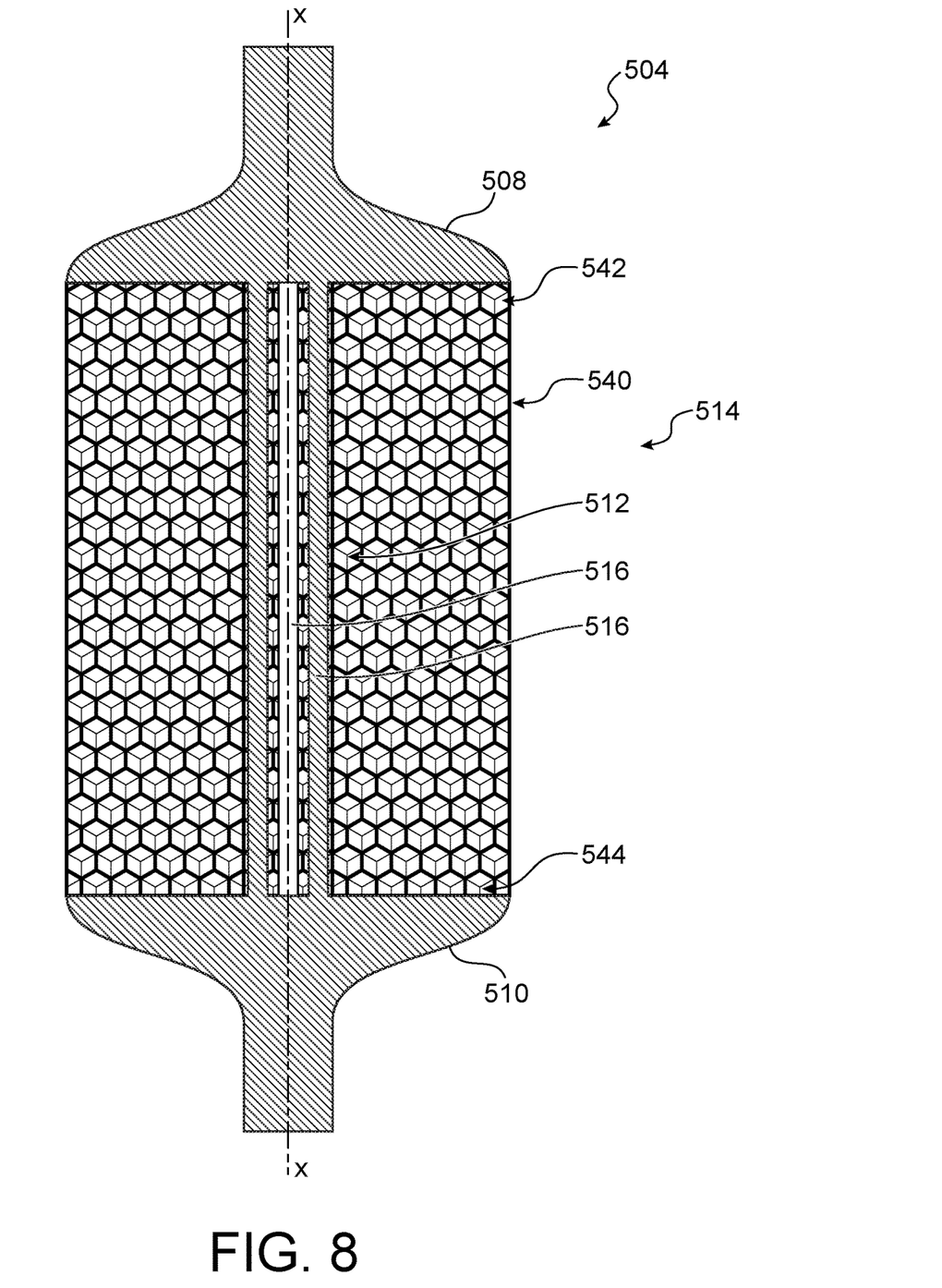
FIG. 8 is a sectional view of a fifth embodiment of a damping system according to the invention, in a plane containing a longitudinal axis of the damping system and passing through two beams of the damping system.

The damping system 504 of FIG. 8 differs from the damping system 4 of FIGS. 1 to 3 in that the secondary damper device 514 does not comprise a curved member, and comprises at least one meshed element 540 having a three-dimensional lattice structure.

The meshed element 540 comprises two opposite ends 542, 544, each connected to one of the first base 508 and the second base 510.

In addition, the damping system 504 is configured so that, during buckling of the beams 516 of the primary damper device 512, each meshed member 540 is subjected to an urging of one of its two ends 542, 544 towards the other one of its two ends 542, 544, resulting in an elastic deformation of the meshed element 540.

For example, the meshed element 540 generally defines a hollow cylinder extending along the longitudinal axis X-X and arranged between the first base 508 and the second base 510. In this case, the hollow cylinder-shaped meshed element radially surrounds the beams 516.

According to an embodiment (not shown) of the damping system according to the invention, at least one curved member 20 is arranged so that a concavity 21 of the curved member 20 is oriented opposite the longitudinal axis X-X.

According to an embodiment (not shown) of the damping system according to the invention, the curved members 20 are connected, without being attached, to the first base 8 and to the second base 10, and the secondary damper device 14 is capable of moving along the longitudinal axis X-X.

More specifically, the ends 22 of the curved members 20 which are closest to the first base 8 are attached together to form a first ring. In addition, the ends 22 of the curved members 20 which are closest to the second base 10 are attached together to form a second ring. Each of the first ring and the second ring radially surrounds the beams 16.

In addition, each of the first base 8 and the second base 10 comprises a stop intended to limit the displacement of the secondary damper device 14 in translation along the longitudinal axis X-X.

In this case, the dimensions of the secondary damper device 14 are such that, when the beams 16 undergo buckling, the first base 8 comes into contact with the first ring, and the second base 10 comes into contact with the second ring, in order to transmit to the curved members 20 the force applied to the bases 8, 10. Then, the curved members 20 bend to absorb at least part of the energy provided by the longitudinal force.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A structure for aircraft comprising at least one damping system, each damping system extending along a longitudinal axis and comprising:
   a first base and a second base arranged at a distance from one another along the longitudinal axis;
   a primary damper device, the primary damper device comprising at least one beam, each of the at least one beam extending along a direction parallel to the longitudinal axis, each of the at least one beam comprising two opposite ends and being attached to the first base by one of the two opposite ends and to the second base by another one of the two opposite ends;
   a secondary damper device comprising two ends, the secondary damper device being connected to the first base by one of the two ends, and to the second base by another one of the two ends;
   the damping system being configured so that:
      at rest, the primary damper device has a stiffness, along the direction of the longitudinal axis, greater than a stiffness of the secondary damper device along the direction of the longitudinal axis;
      when a force applied to the damping system for urging the first base towards the second base has a value less than a predetermined limit value, each of the at least one beam remains in a state of compression and wherein the at least one beam does not bend; and when the force has a value greater than or equal to the predetermined limit value, each beam undergoes buckling and the secondary damper device undergoes elastic deformation, each damping system being configured to take up at least part of forces exerted on the structure, and wherein the secondary damper device comprises at least one curved member, each curved member comprising two opposite ends, each curved member being connected to the first base by one of its two ends, and to the second base by the other one of its two ends, each curved member being configured to undergo elastic bending when the force has a value within a range beyond the limit value.

2. The structure according to claim 1, wherein each curved member is hollow.

3. The structure according to claim 1, wherein each beam is solid.

4. The structure according to claim 1, wherein each beam is radially closer to the longitudinal axis than each curved member.

5. The structure according to claim 1, wherein at least one curved member comprises two arches, each of the two arches comprising two opposite ends, the two ends of each curved member being each formed by a union of two corresponding respective ends of the two arches, the two arches each having a concavity, the concavities of the two arches facing away from each other.

6. The structure according to claim 1, comprising a single curved member, the curved member having circular symmetry around the longitudinal axis.

7. A structure for aircraft comprising at least one damping system, each damping system extending along a longitudinal axis and comprising:
   a first base and a second base arranged at a distance from one another along the longitudinal axis;
   a primary damper device, the primary damper device comprising at least one beam, each of the at least one beam extending along a direction parallel to the longitudinal axis, each of the at least one beam comprising two opposite ends and being attached to the first base by one of the two opposite ends and to the second base by another one of the two opposite ends;
   a secondary damper device comprising two ends, the secondary damper device being connected to the first base by one of the two ends, and to the second base by another one of the two ends;
   the damping system being configured so that:
      at rest, the primary damper device has a stiffness, along the direction of the longitudinal axis, greater than a stiffness of the secondary damper device along the direction of the longitudinal axis;
      when a force applied to the damping system for urging the first base towards the second base has a value less than a predetermined limit value, each of the at least one beam remains in a state of compression and wherein the at least one beam does not bend; and
      when the force has a value greater than or equal to the predetermined limit value, each beam undergoes buckling and the secondary damper device undergoes elastic deformation,
   each damping system being configured to take up at least part of forces exerted on the structure, and
   wherein the secondary damper device comprises at least one curved member, each curved member comprising two opposite ends, each curved member being connected to the first base by one of its two ends, and to the second base by the other one of its two ends, each curved member being configured to undergo elastic bending when the force has a value within a range beyond the limit value, wherein at least one curved member comprises a straight portion extending along the direction of the longitudinal axis and a plurality of hoops, the straight portion comprising two opposite ends, each hoop comprising two opposite ends, each of the two ends of each hoop being attached to a corresponding end of the straight portion.

8. A structure for aircraft comprising at least one damping system, each damping system extending along a longitudinal axis and comprising:
   a first base and a second base arranged at a distance from one another along the longitudinal axis;
   a primary damper device, the primary damper device comprising at least one beam, each of the at least one beam extending along a direction parallel to the longitudinal axis, each of the at least one beam comprising two opposite ends and being attached to the first base by one of the two opposite ends and to the second base by another one of the two opposite ends;
   a secondary damper device comprising two ends, the secondary damper device being connected to the first base by one of the two ends, and to the second base by another one of the two ends;
   the damping system being configured so that:
      at rest, the primary damper device has a stiffness, along the direction of the longitudinal axis, greater than a stiffness of the secondary damper device along the direction of the longitudinal axis;
      when a force applied to the damping system for urging the first base towards the second base has a value less than a predetermined limit value, each of the at least one beam remains in a state of compression and wherein the at least one beam does not bend; and
      when the force has a value greater than or equal to the predetermined limit value, each beam undergoes buckling and the secondary damper device undergoes elastic deformation,
   each damping system being configured to take up at least part of forces exerted on the structure, and
   wherein the secondary damper device comprises at least one meshed element, each meshed element having a three-dimensional lattice structure, each meshed element comprising two opposite ends, each meshed element being connected to the first base by one of its two ends, and to the second base by the other one of its two ends,
   each meshed element being configured to undergo elastic biasing of one of its two ends towards the other one of its two ends when the force has a value within a range beyond the limit value.

9. The structure according to claim 1, wherein the damping system forms a spacer connecting at least two structural elements fixed relative to each other.

10. An aircraft comprising the structure according to claim 1.

* * * * *